Feb. 20, 1962  J. R. McKEE, JR  3,021,927
LAP-LOX FASTENER
Filed April 6, 1959

INVENTOR.
JOHN R. McKEE JR.
BY
Christy, Parmelee & Strickland.
ATTORNEYS.

United States Patent Office 3,021,927
Patented Feb. 20, 1962

3,021,927
LAP-LOX FASTENER
John R. McKee, Jr., 1900 Murdstone Drive,
Pittsburgh 34, Pa.
Filed Apr. 6, 1959, Ser. No. 804,478
2 Claims. (Cl. 189—36)

The present invention relates to screw-threaded fasteners for securing together a lap joint formed between relatively frangible or light gauge materials.

Industrial covering materials, particularly corrugated materials such as light gauge metals, translucent plastics, etc. are increasingly used as roofing and siding of buildings. These materials are applied in standard size sheets secured to the supporting building structure. When forming a joint between adjacent edges of two such corrugated sheets, the customary practice is to lap the sheets for one or more corrugations and to secure the lapped sheets together with suitable fasteners extending through the lapped portions of the sheet.

When the sheets are of sufficient rigidity and thickness the well known sheet metal screws and bolts may be used. Where, however, the roofing and siding sheets are of very thin cross-section or are frangible, sheet metal screws which cut their own threads in the material cannot be used. This because the material is too thin to provide a holding thread for the screw or are too frangible to permit the screw to cut threads therein. The materials will, however, permit drilling holes therein and use of machine screws or bolts.

By reason of roofing and siding sheets of buildings being exposed to the weather, any holes drilled through the sheets must be sealed against moisture and a sealing washer or other substitute must be applied to the screws or bolts used at such lapped joints. The customary and most efficient method of applying such fasteners is from the outer side of the joint and when bolts are used, a man must be stationed at the outside and at the inside of the joint to insert and tighten the nuts on such bolts. The man on the inside of the joint must be supported by scaffolding, the moving of which from point-to-point in a building is not only hazardous, but very costly.

Such thin and/or frangible material is subject to distortion or breaking when tightening such bolt and nut fasteners, thereby causing an unsightly appearance as well as increasing the possibilities of moisture entering around such fasteners. These conditions result from the normal and usual separation of the sheets at the lapped joints and the necessity for the fastener to draw the separated sheet portions together in securing a weather-tight joint.

An object of the present invention is to provide a factory assembled fastener for such lap joints which may be applied as a unit and tightened from only one face of the joint.

Another object of the invention is to provide such a factory assembled fastener with suitable sealing means whereby low cost, weather tight, positive fastening of such lapped joint is obtained.

Another object of the invention is to provide a fastener of the type described which supplies sufficient resiliency to prevent distortion and/or fracture of the light gauge material.

These and other objects of the invention will be made apparent from the following description and the drawing forming a part thereof wherein.

Figure 1:
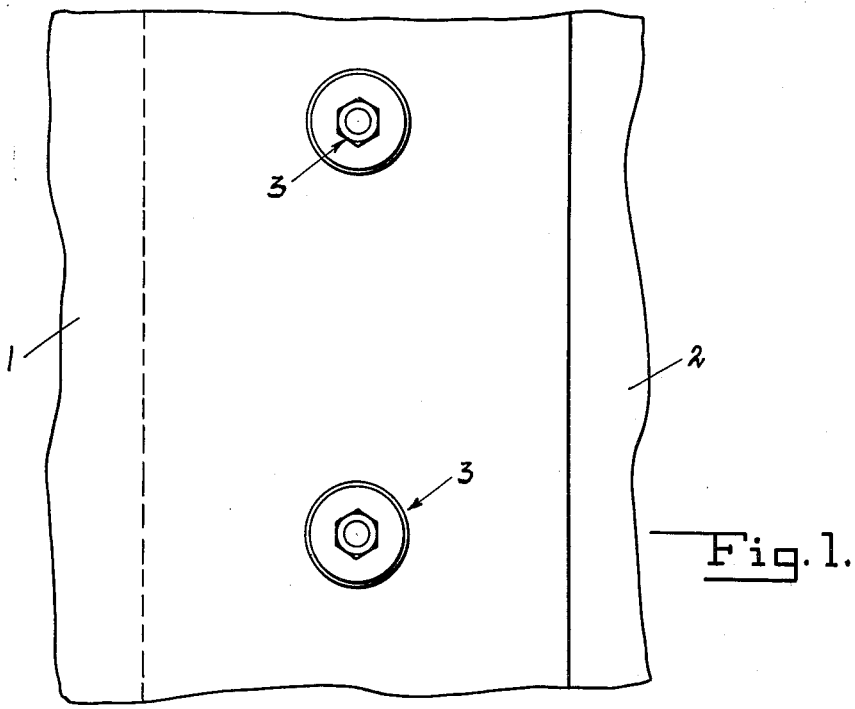
FIG. 1 shows a plan view of a portion of a lapped joint between two sheets of corrugated material, with the fastener of the invention in place.
Figure 2:
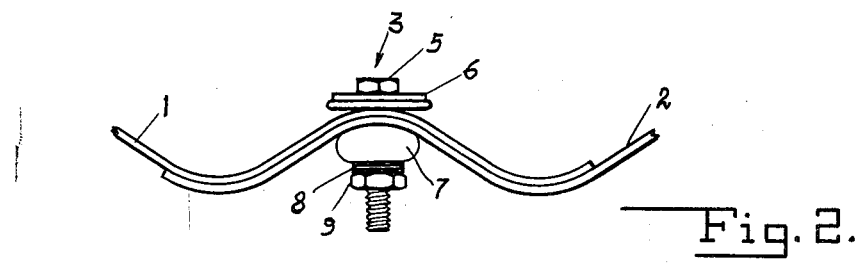
FIG. 2 shows an end elevation of the joint and fastener of FIG. 1.

Referring now in detail to the drawings, where like reference characters refer to like parts, the corrugated sheet 1 is lapped over corrugated sheet 2 at a joint between edges of adjacent sheets of metal, plastic, etc., used for siding and/or roofing of a building. Such a lap joint is formed at the ends and sides of adjacent sheets. The fasteners indicated generally at 3 are inserted through openings 4 suitably spaced along the joint.

These fasteners 3, are preassembled at the factory and comprise a headed fastener 5, washer 6, rubber sleeve 7, special washer 8 and nut 9. Fastener 5 has a shank portion 10 which is threaded substantially its full length and may have a hexagonal or square head for engagement by a suitable tool for tightening the fastener. Sleeve 7 is a hollow cylindrical section of natural or synthetic rubber-like material, such as neoprene. The sleeve material is suitably flexible to be readily compressed axially and has an internal diameter of sufficient size to readily pass the shank 10 of bolt 5. The special washer 8 has an outside diameter not greater than that of the sleeve 7 and an inside diameter larger than that of the shank 10 of fastener 5. The hex nut 9 has an integral threaded diameter receiving the threaded shank 10 of fastener 5 and an outside diameter not greater than that of sleeve 7. These are assembled at the factory, as shown in FIG. 3, with nut 9 engaged with washer 8 and the latter engaged with sleeve 7.

The method of applying such covering material to the building structure to obtain lapped joints is standard practice in the industry. When applied to the roof, the sheets are of sufficient length to span the adjacent roof purlins and provide support for a workman. The first sheet is suitably secured to the purlins and a second sheet is laid beside the first, with the adjacent edges over-lapping with a double thickness at the crown of the corrugations to receive the fastener 3. A suitable tool, such as an electric drill, is used to drill holes 4 through the lapped crowns of the corrugated sheets. Such holes are spaced a suitable distance, as specified by the sheet or fastener manufacturer or the architect. These holes 4 are disposed between the sheet supporting purlins. The diameter of such holes 4 is such as to readily pass the fastener tubing 7 but not the washer 6 beneath the head of fastener 5. The sleeve 7 is of such length as to protrude through the lapped sheets as shown in FIG. 3.

Figures 3, 4:
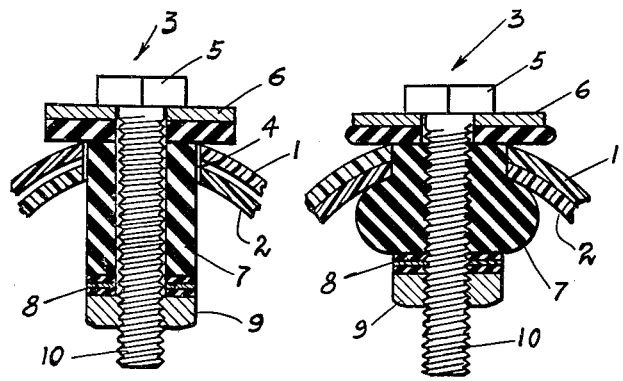
FIG. 3 shows a cross-section through the fastener and sheets, with the fastener initially inserted in the hole drilled through the lapped sheets.
FIG. 4 shows the fastener of FIG. 3 when tightened to secure a weather tight joint.

After the lap joint is drilled with the necessary number of holes 4 and the fasteners inserted as in FIG. 3, a suitable tool, preferably an electrically driven nutrunner is engaged with the fastener heads 5 and the fastener is tightened into a position shown in FIG. 4. This tightening operation is performed by rotating shank 10 causing nut 9 to advance axially of shank 10 to compress sleeve 7 and draw the sheets 1 and 2 tightly together. This tightening operation is performed wholly from one side of the lapped joint.

These fasteners, for speed and economy in use, are assembled at the factory with the nut 9 sufficiently tightened to hold washer 8, sleeve 7 and washer 6 in abutting relation with washer 6 against the head of fastener 5, without any appreciable compression of sleeve 7. As a precautionary measure the user may rotate the nut 9, "finger-tight" against the washer 8 and sleeve 7. When the head of fastener 5 is rotated, the rubber facing of washer 8 prevents rotation of nut 9 and the entire assembly moves axially of shank 10 of fastener 5 as the rotating shank 10 advances through nut 9.

Should nut 9 not be holding washer 8 against sleeve 7, when inserted into holes 4 in the over-lapped sheets 1 and 2 the fastener will still tighten. Due to the opposite rubber-like faces of washer 8 and the clearance between the inside diameter of washer 8 and the periphery of shank 10, the washer 8 will ordinarily tilt slightly on shank 10 to engage both the sleeve 7 and nut 9 preventing rotation of nut 9 when shank 10 is rotated. If this is not sufficient to restrict rotation of nut 9, the operator by pressing downwardly on the head of fastener 5 can cock washer 8 sufficiently to restrain rotation of nut 9 and the fastener will tighten.

The washer 6 is comprised of a rigid backing portion and a rubber facing portion secured to the under face of the backing portion, spacing the rigid backing portion from engagement with the outer face of the lapped sheets. Such washer facing portion is somewhat compressible and will seal tightly against the adjacent face of the lapped sheets. The sleeve 7 when compressed by the nut 9 will expand radially, as shown in FIG. 4 and permit shank 10 to pull the over-lapped sheets togther. Thus a tight leak-proof seal is provided at opposite ends of the openings 4 in the lapped sheets. The radially expanding portions of sleeve 7 provide a resilient bearing for washer 8 and nut 9.

The fastener as herein described has been field tested and found satisfactory. Generally, the assembly as described is preferable for best results. The washers 6 and 8 preferably have a metal backing member, but may use other substantially rigid non-metallic material. The shank 10 of fastener 5 is preferably provided with a standard thread, for the size used, which is normally rated as a #10 or 3/16" diameter machine screw. A coarser thread may be used.

Preferably the sleeve 7 is used as a piece of rubber-like tubing and the washer 6 is as described. It is possible to form a flange on the sleeve 7 as a substitute for the rubber facing on washer 6 and then use a plain metal washer betwen the end of sleeve 7 and the head of fastener 5. The construction as shown in the drawing is preferable.

I claim:

1. A resilient sealing fastener connection between lapped sheet material having concentric fastener receiving apertures therein, comprising an axially compressible and radially expandable resilient hollow sleeve member freely slidably mounted in said apertures and extending outwardly from the under side of said lapped sheets, a rigid apertured member overlying said sleeve at the outer side of said lapped sheets, an apertured member having its opposite surfaces coated with resilient material and one coated face abutting the outwardly extending end of the sleeve at the under side of said sheets, an apertured internally threaded member abutting the other face of said coated member, and a headed member having an externally threaded shank extending axially through all of said members and into threaded contact with said internally threaded member whereby upon rotation of the head of said headed member said sleeve member is compressed between said apertured members and axially shortened and radially expanded securing the sheets in fixed lapped relation.

2. A fastener for passage through preformed substantially concentric apertures in lapped corrugated sheet material in providing a resilient sealed connection between said sheets, comprising a hollow cylindrical sleeve of axially compressible and radially expandable rubber-like material having an external diameter less than that of the apertures, a headed fastener having a threaded shank longer than said sleeve slidable axially therethrough, a washer slidably mounted axially of said fastener shank and disposed between said fastener head and the adjacent inner end of the said sleeve, said washer providing a bearing surface for said head in rotating the fastener shank, a rigid washer slidably mounted on said fastener shank between the outer end of said sleeve and the adjacent end of the said shank, said washer having a central opening therein substantially larger than the said shank, a layer of non-metallic material on opposite faces of said washer surrounding said opening therein, and an internally threaded nut mounted on the end of said shank adjacent one non-metallic face of the adjacent washer.

References Cited in the file of this patent

UNITED STATES PATENTS

| | | |
|---|---|---|
| 2,365,372 | Allen | Dec. 19, 1944 |
| 2,513,193 | Miller | June 27, 1950 |
| 2,688,894 | Modrey | Sept. 4, 1954 |

FOREIGN PATENTS

| | | |
|---|---|---|
| 433,038 | Great Britain | Aug. 8, 1935 |
| 704,510 | Great Britain | Feb. 24, 1954 |
| 1,056,501 | France | Oct. 21, 1953 |